(12) United States Patent
Yoshida

(10) Patent No.: US 9,615,070 B2
(45) Date of Patent: Apr. 4, 2017

(54) VIDEO SIGNAL PROCESSING DEVICE AND PROJECTION-TYPE DISPLAY DEVICE

(71) Applicant: JVC KENWOOD CORPORATION, Yokohama-shi, Kanagawa (JP)

(72) Inventor: Atsushi Yoshida, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/079,427

(22) Filed: Mar. 24, 2016

(65) Prior Publication Data

US 2016/0366382 A1    Dec. 15, 2016

(30) Foreign Application Priority Data

Jun. 15, 2015   (JP) .................................. 2015-119945

(51) Int. Cl.
*H04N 3/23*        (2006.01)
*H04N 9/31*        (2006.01)

(52) U.S. Cl.
CPC .................................. *H04N 9/3185* (2013.01)

(58) Field of Classification Search
CPC .......... H04N 9/31; H04N 9/3185; H04N 5/64; H04N 3/22; H04N 3/23
USPC .................................. 348/744, 745, 746, 747
See application file for complete search history.

(56) References Cited

U.S. PATENT DOCUMENTS

| | | | |
|---|---|---|---|
| 7,175,285 B2* | 2/2007 | Li | H04N 5/74 348/747 |
| 7,384,157 B2* | 6/2008 | Muraoka | G03B 21/14 348/E17.005 |
| 8,659,508 B2* | 2/2014 | Todoroki | G09G 3/002 345/698 |
| 9,075,295 B2* | 7/2015 | Tsuji | G03B 21/145 |
| 9,140,967 B2* | 9/2015 | Aoki | G03B 21/60 |
| 9,398,278 B2* | 7/2016 | Chao | H04N 9/3173 |
| 2004/0201594 A1* | 10/2004 | Nashida | G06T 3/4007 345/647 |
| 2007/0097326 A1* | 5/2007 | Yang | G03B 21/14 353/69 |

(Continued)

FOREIGN PATENT DOCUMENTS

| | | |
|---|---|---|
| JP | 2004-246242 A | 9/2004 |
| JP | 5010262 A | 6/2012 |

*Primary Examiner* — Trang U Tran
(74) *Attorney, Agent, or Firm* — Nath, Goldberg & Meyer; Jerald L. Meyer

(57) ABSTRACT

A black stripe detector is configured to detect a black stripe region of an input video signal in which a part of an effective region is a black stripe region, and to generate black stripe information. A keystone correction processor is configured to implement keystone correction processing for the input video signal, and to generate a keystone-corrected video signal. A black stripe information corrector is configured to correct the black stripe information which indicates a corrected black stripe region owned by the keystone correction video signal, to corrected black stripe information based on keystone correction parameters when the keystone correction processor performs keystone correction processing for the input video signal. A video signal processor is configured to implement predetermined video signal processing for the keystone-corrected video signal by using the keystone-corrected video signal and the corrected black stripe information.

6 Claims, 5 Drawing Sheets

(56) References Cited

U.S. PATENT DOCUMENTS

2013/0038223 A1* 2/2013 Aoki .................... G03B 21/567
 315/153

* cited by examiner

VIDEO SIGNAL PROCESSING DEVICE AND PROJECTION-TYPE DISPLAY DEVICE

CROSS REFERENCE TO RELATED APPLICATION

This application is based upon and claims the benefit of priority under 35 U.S.C. §119 from Japanese Patent Application No. 2015-119945, filed on Jun. 15, 2015, the entire contents of which are incorporated herein by reference.

BACKGROUND

The present disclosure relates to a video signal processing device and a projection-type display device.

As aspect ratios of an effective region of a video signal, various types are present, which include: 4:3 of the NTSC system; 16:9 of the high vision system; 1.375:1 for use in a movie, and the like. For example, in order to create a video signal with an aspect ratio of 16:9 based on a video signal with an aspect ratio of 4:3, black stripe regions are often added on the right and left sides of a video region with the aspect ratio of 4:3 to create a video signal with the aspect ratio of 16:9.

As described above, when creating a video signal with another aspect ratio based on the video signal with a certain aspect ratio, in some cases, the black stripe regions are added to the upper and lower or right and left sides of the video region, and the video signal with another aspect ratio is created.

SUMMARY

Incidentally, when displaying a video which is based on a video signal on a screen by a projection-type display device (a so-called projector), in the case of projecting video light from an oblique direction with respect to the screen in the horizontal direction or the vertical direction, the video displayed on the screen is distorted into a trapezoid. Accordingly, the projection-type display device mounts thereon a keystone correction function to correct such a trapezoidal video into a rectangle.

In recent years, demand for improved image quality of the display video has been increased, and in some cases, the projection-type display device has mounted thereon a video signal processing function to improve the image quality of the display video by increasing the amount of information of the video signal, and so on.

In the case where the video signal with the added black stripe regions is inputted to the projection-type display device that mounts thereon the keystone correction function and the video signal processing function, it is necessary for the projection-type display device to further mount thereon a black stripe region detection function to detect the black stripe regions. When processing the video signal by the video signal processing function, the black stripe region detection function is necessary.

When the projection-type display device is mounted with the black stripe region detection function, the keystone correction function, and a predetermined video signal processing function, unless the respective functions are executed in an appropriate order, then in some cases, some of the functions may not be executed appropriately, or the cost of the device is increased unnecessarily due to an increase of bandwidth or capacity of a memory.

A first aspect of the embodiments provides a video signal processing device including: a black stripe detector configured to detect a black stripe region of an input video signal in which a part of an effective region is a black stripe region and to generate black stripe information indicating the black stripe region; a keystone correction processor configured to implement keystone correction processing for the input video signal so as to correct a trapezoidal distortion when the input video signal is projected onto a screen and to generate a keystone-corrected video signal; a black stripe information corrector configured to correct the black stripe information to corrected black stripe information based on keystone correction parameters when the keystone correction processor performs keystone correction processing for the input video signal, the corrected blacks stripe information indicating a corrected black stripe region owned by the keystone correction video signal; and a video signal processor configured to implement predetermined video signal processing for the keystone-corrected video signal by using the keystone-corrected video signal and the corrected black stripe information.

A second aspect of the embodiments provides a projection-type display device including: the above-mentioned video signal processing device; and a projector configured to project a video signal which is outputted from the video signal processor onto the screen.

DETAILED DESCRIPTION

A description is made below of a video signal processing device and a projection-type display device according to the embodiment with reference to the accompanying drawings.

Figure 1:
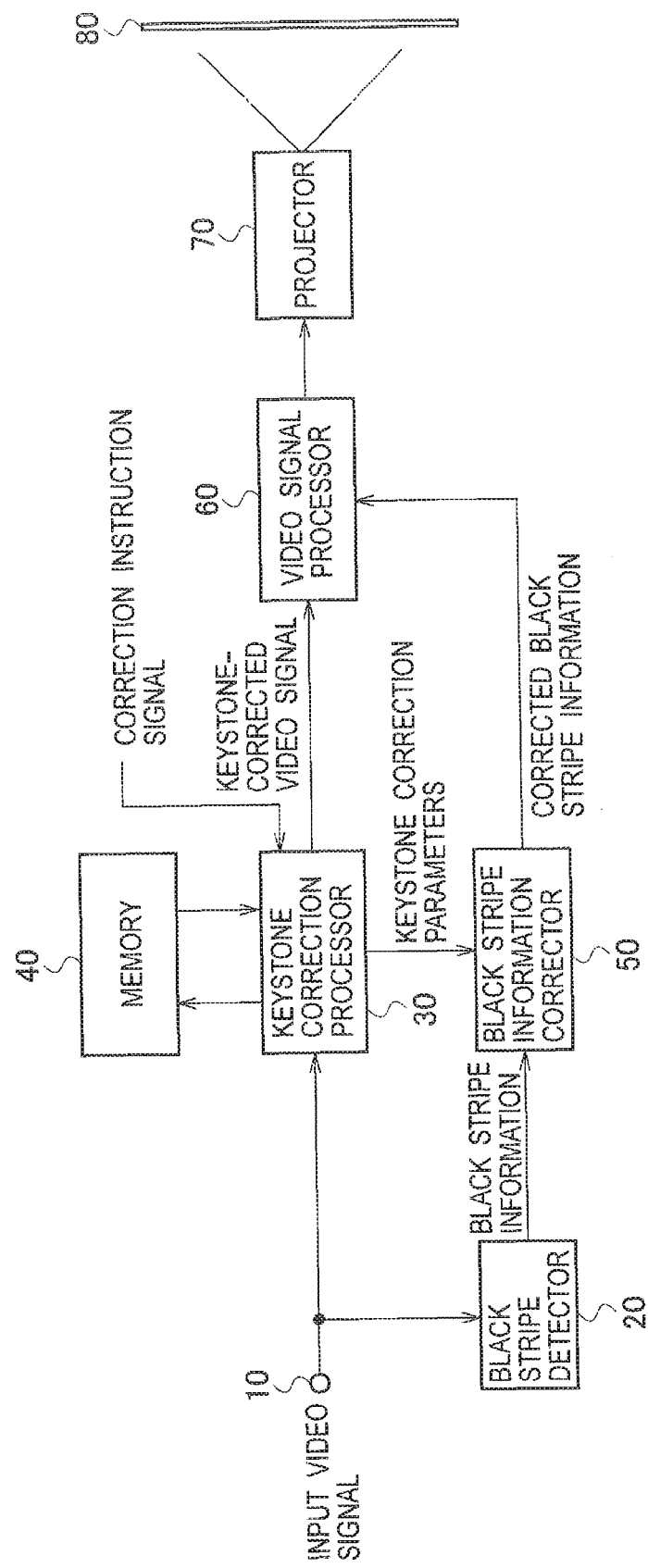
FIG. 1 is a block diagram showing a video signal processing device and a projection-type display device according to at least one embodiment.

In FIG. 1, a video signal, in which part of an effective region is a black stripe region, is inputted to an input terminal 10, The video signal inputted to the input terminal 10 is referred to as an input video signal. As an example shown in FIG. 2, the input video signal is a video signal in which such black stripe regions SbR and SbL are added to the right and left sides of a video region S0 with an aspect ratio 4:3, respectively, whereby a video S1 with an aspect ratio 16:9 is formed.

The input video signal may be a video signal in which the black stripe regions are added to the right and left sides of a video region with a first aspect ratio, whereby a video with a second aspect ratio is formed, or may be a video signal in which the black stripe regions are added to upper and lower sides of the video with the first aspect ratio, whereby the video with the second aspect ratio is formed.

The input video signal is inputted into a black stripe detector 20 and a keystone correction processor 30. A correction instruction signal is inputted to the keystone correction processor 30. The correction instruction signal is generated in such a manner that the user operates an operation unit (not shown) in order to correct a trapezoidal distortion of the video signal projected onto a screen 80.

The video signal processing device may be configured to automatically generate the correction instruction signal.

By an arbitrary technique such as a black stripe region detection circuit described in Japanese Patent No. 5010262, the black stripe detector 20 detects whether or not the black stripe regions are present, detects which portions of a video are the black stripe regions, and generates black stripe information indicating the black stripe regions. The black stripe information is inputted to a black stripe information corrector 50.

The keystone correction processor 30 writes the input video signal into the memory 40, and reads the video signal from the memory 40 so that the input video signal is subjected to keystone correction processing, and thereby generates a keystone-corrected video signal. At this time, the keystone correction processor 30 generates parameters (hereinafter, referred to as keystone correction parameters) for the keystone correction processing.

Figure 3:
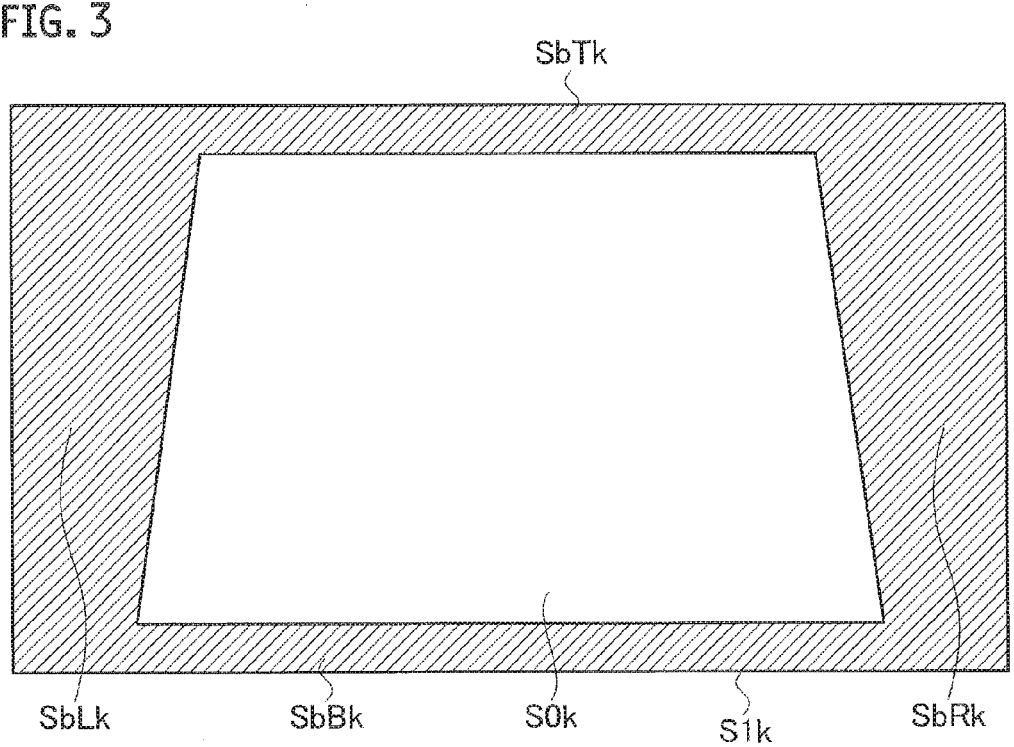
FIG. 3 is a view showing an example of a video signal subjected to keystone correction.

In the case where a trapezoidal distortion of a projection video displayed on the screen 80 is a trapezoidal distortion in a state where an upper side thereof in the vertical direction is wide and a lower side thereof is narrow, the keystone-corrected video signal generated by the keystone correction processor 30 becomes a signal like a video S1k shown in FIG. 3.

Figure 2:
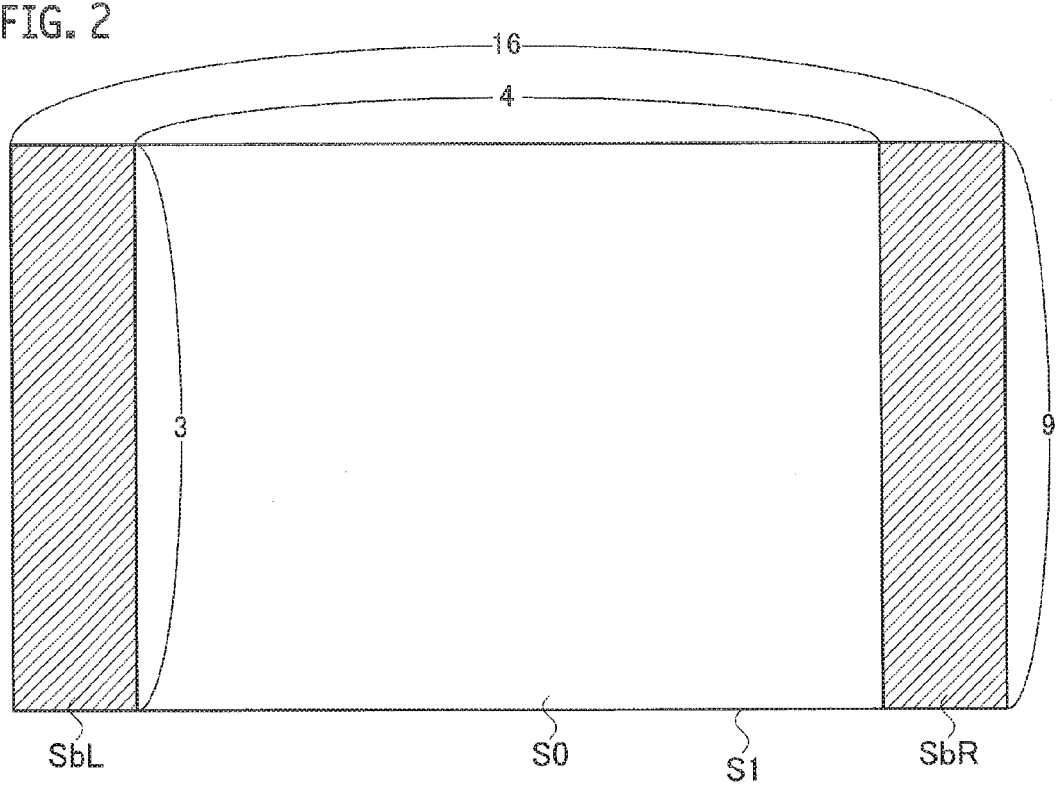
FIG. 2 is a view showing an example of a video signal having black stripe regions.

As shown in FIG. 3, the video region S0 shown in FIG. 2 is converted into a video region S0k in which an upper side in the vertical direction is narrow and a lower side therein is wide. The right and left black stripe regions SbR and SbL are converted into black stripe regions SbRk and SbLk in which the upper sides in the vertical direction are wide and lower sides therein are narrow. In order to allow an aspect ratio of the video region S0k to coincide with the aspect ratio of the video region S0, the black stripe regions SbTk and SbBk are added to the upper and lower sides of the video region S0k, respectively.

The keystone-corrected video signal is inputted to a video signal processor 60. The keystone correction parameters are inputted to the black stripe information corrector 50.

The black stripe information corrector 50 corrects the black stripe information by using the keystone correction parameters, and generates corrected black stripe information. The corrected black stripe information indicates corrected black stripe regions owned by the keystone-corrected video signal. The corrected black stripe information is inputted into the video signal processor 60.

The video signal processor 60 implements predetermined video signal processing for the keystone-corrected video signal. For example, the video signal processor 60 is a video signal processing circuit that increases the amount of information of the video signal and improves the image quality of the display video. The video signal processor 60 implements the video signal processing for the keystone-corrected video signal by using a memory (not shown).

Specifically, as an example, the video signal processor 60 is a frame rate conversion circuit which generates an interpolation frame, inserts the generated interpolation frame between frames adjacent to each other, and thereby converts a frame rate of the keystone-corrected video signal. As another example, the video signal processor 60 is an up-conversion circuit (resolution conversion circuit), which increases the number of lines in 1 frame, increases the number of pixels in 1 line, and thereby increases the resolution.

For example, the frame rate conversion circuit converts a video signal with a frame frequency of 60 Hz into a video signal with a frame frequency of 120 Hz or 240 Hz. For example, the up-conversion circuit converts an NTSC signal into a high vision signal.

It is necessary for the video signal processor 60 to generate the interpolation frame and generate an up-converted video signal by using a pixel signal of the video region S0k in FIG. 3.

To the video signal processor 60, there are inputted: the keystone-corrected video signal and the corrected black stripe information, the latter of which is corrected in response to the keystone-corrected video signal, and properly identifies a portion of the black stripe region SbRk, SbLk, SbTk, or SbBk, and a portion of the video S0k from each other.

In the interpolation frame generation in the frame rate conversion circuit and the interpolation pixel generation in the up-conversion circuit, if the pixels of the black stripe region are referred to in the event of generating the pixels of the effective region, then undesirably, such interpolation pixels are generated that allow the black stripe to enter an interpolation effective region. On the contrary, if the pixels of the effective region are referred to in the event of generating the pixels of the black stripe region, then undesirably, such interpolation pixel are generated that allow the effective region to extend over an interpolated black stripe region.

The corrected black stripe information is inputted to the video signal processor 60, and accordingly, the pixels of the region determined to be the black stripe region can be avoided being used for the interpolation of the effective region, and the pixels of the effective region can be avoided being used for the interpolation of the region determined to be the black stripe region.

Hence, the video signal processor 60 individually uses the pixel signal of the video region S0k and the pixel signal on the outside of the video region S0k in an appropriate manner, and can thereby implement the video signal processing for improving the image quality while preventing a deterioration of the image quality.

A projector 70 projects video light, which is based on the video signal outputted from the video signal processor 60 onto the screen 80. For example, the projector 70 includes: a liquid crystal panel for writing the video signal; a light source for irradiating projection light onto the liquid crystal panel; and a projection optical system for projecting the light, which transmits through or is reflected on the liquid crystal panel onto the screen 80.

In accordance with the video signal processing device and the projection-type display device according to the embodiment, the black stripe detector 20 detects the black stripe regions based on the video signal that is not subjected to the keystone correction processing yet, and accordingly, the black stripe regions are detected appropriately.

In accordance with the video signal processing device and the projection-type display device according to the embodiment, the keystone correction processor 30 implements the keystone correction processing for the input video signal before the video signal processor 60 implements the video signal processing for the input video signal, and accordingly, cost of the device is not increased unnecessarily.

Hence, in accordance with the video signal processing device according to the embodiment, it is possible to appropriately execute the functions: the black stripe region detection function, the keystone correction function, and the video signal processing function, without unnecessarily increasing the cost of the device.

Next is a description of an example of a specific method by which the black stripe information corrector 50 corrects the black stripe information to generate the corrected black stripe information. As described with reference to FIG. 3, when the video S1 shown in FIG. 2 is subjected to the keystone correction, the black stripe regions SbTk and SbBk are added to the upper and lower sides, respectively; however, for simplification, the following description is sometimes made while omitting the black stripe regions SbTk and SbBk.

First Example

Figure 4:
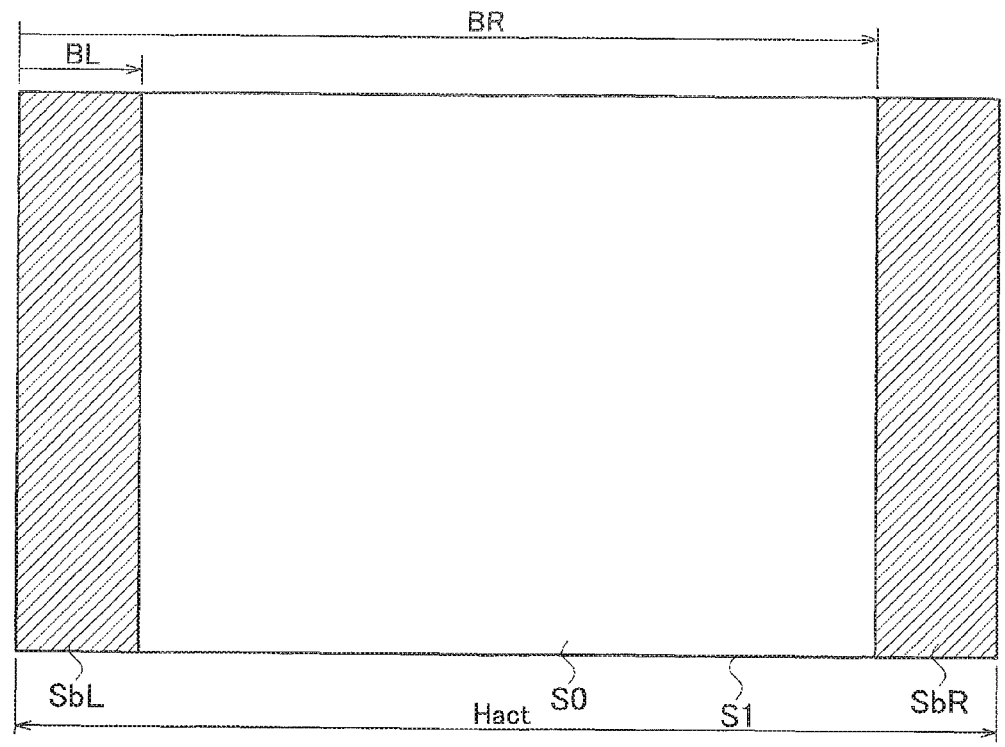
FIG. 4 is a view showing an ending position and starting position of the black stripe regions detected by a black stripe detector.

As shown in FIG. 4, the black stripe detector 20 detects a pixel number BL from, the left end portion of the effective region of the video S1 to the ending position of the black stripe region SbL, and a pixel number BR from the left end portion of the effective region of the video S1 to the starting position of the black stripe region SbR. Information indicating the pixel number BL or BR is the black stripe information. An effective pixel number in the horizontal direction of the video S1 is defined as Hact.

Figure 5:
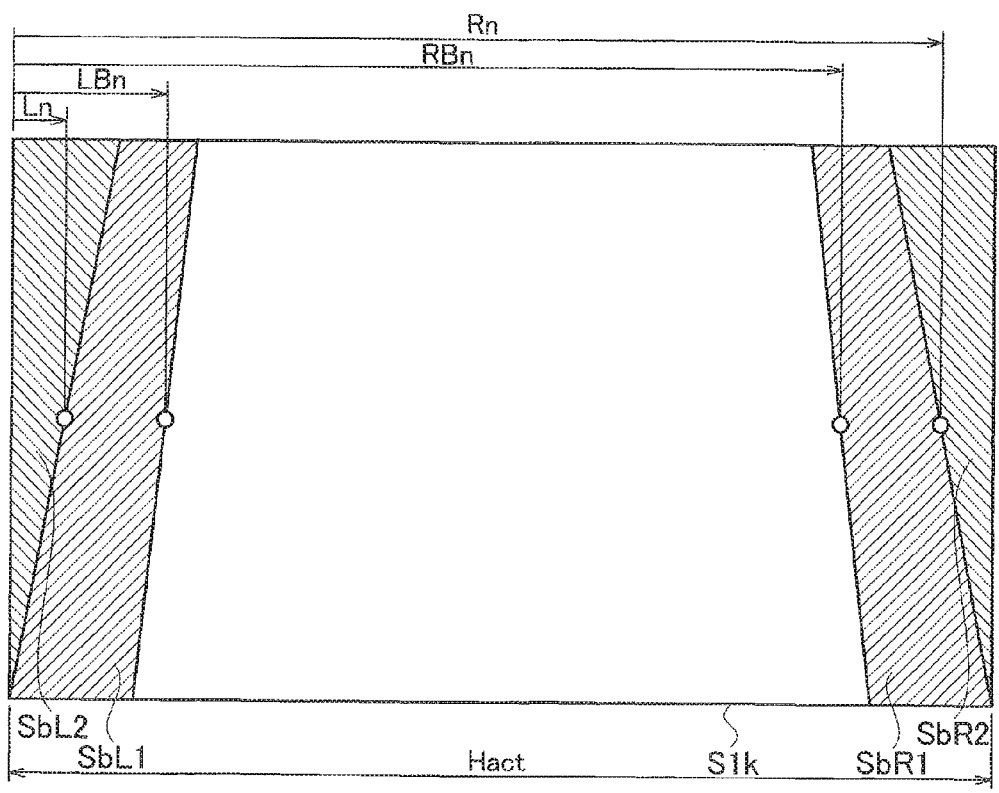
FIG. 5 is a view for explaining the black stripe regions subjected to the keystone correction.

As shown in FIG. 5, the black stripe regions SbRk and SbLk on the right and left sides in FIG. 3, when the video S1 shown in FIG. 2 is subjected to the keystone correction, is composed of: corrected black stripe regions SbR1 and SbL1 obtained by subjecting the black stripe regions SbR and SbL to the keystone correction; and added black stripe regions SbR2 and SbL2 added in order to maintain the aspect ratio of the video S1 on the outside regions of these.

Though the black stripe regions SbTk and SbBk on the upper and lower sides are omitted in FIG. 5, such a video obtained by subjecting the video S1 to the keystone correction is referred to as the video S1k in a similar way to FIG. 3.

The keystone correction processor 30 supplies the black stripe information corrector 50 with, as the keystone correction parameters, a starting position Ln of the corrected black stripe region SbL1, and an ending position Rn of the corrected black stripe region SbR1 at individual vertical positions of the keystone-corrected video signal.

The starting position Ln is information indicating a horizontal effective region starting position, and the ending position Rn is information indicating a horizontal effective region ending position. The starting position Ln is at the pixel number from the left end portion of the effective region of the video S1k to the starting position of the corrected black stripe region SbL1, and the ending position Rn is at the pixel number from the left end portion of the effective region of the video S1k to the ending position of the corrected black stripe region SbR1.

Based on the following Equations (1) and (2), the black stripe information corrector 50 obtains the black stripe ending position LBn of the corrected black stripe region SbL1 and the black stripe starting position RBn of the corrected black stripe region SbR1.

$$LBn = Ln + \{(Rn-Ln)/\text{Hact}\} \times BL \quad (1)$$

$$RBn = Rn - \{(Rn-Ln)/\text{Hact}\} \times (\text{Hact}-BR) \quad (2)$$

The black stripe information corrector 50 supplies the video signal processor 60 with the corrected black stripe information, indicating the black stripe ending position LBn and the black stripe starting position RBn at the individual vertical positions of the keystone-corrected video signal. In such a way, the video signal processor 60 can implement the video signal processing for the keystone correction video signal appropriately.

Though the description is made here only of the keystone correction in the horizontal direction, the same applies to the case where keystone correction in the vertical direction is performed. The keystone correction processor 30 just needs to give information indicating a vertical effective region starting position and a vertical effective region ending position at individual horizontal positions of the keystone-corrected video signal, as the keystone correction parameters, to the black stripe information corrector 50.

The black stripe information corrector 50 just needs to supply information indicating a black stripe ending position and a black stripe starting position at the individual horizontal positions of the keystone-corrected video signal to the video signal processor 60 as the corrected black stripe information. The keystone correction may be performed in only either one of the horizontal direction, the vertical direction, or in both thereof.

Second Example

Figure 6:
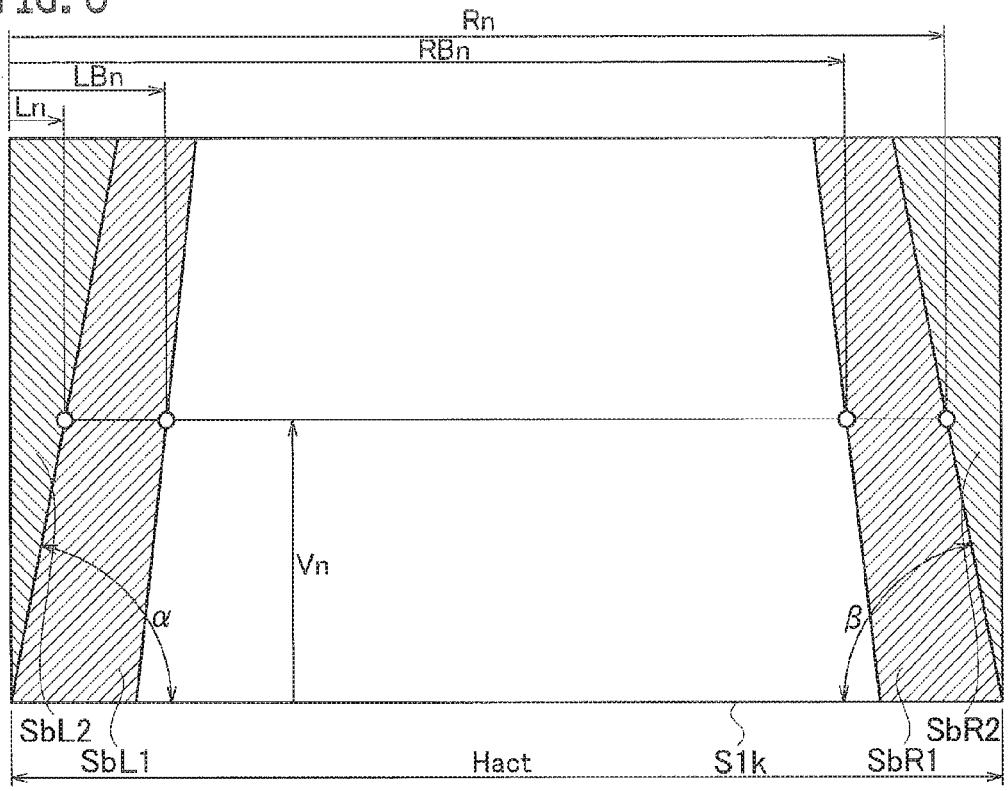
FIG. 6 is a view for explaining correction angles of an effective region in a keystone-corrected video signal.

In a second example, the keystone correction processor 30 does not supply the starting position Ln and the ending position Rn to the black stripe information corrector 50, but supplies thereto correction angles $\alpha$ and $\beta$ shown in FIG. 6 as the keystone correction parameters. The correction angle $\alpha$ and the correction angle $\beta$ may be the same.

A vertical distance as a line number from a line on a lower end is defined as Vn. Based on the following Equations (3) and (4), the black stripe information corrector 50 obtains the starting position Ln and the ending position Rn.

$$Ln = Vn/\tan\alpha \quad (3)$$

$$Rn = \text{Hact} - Vn/\tan\beta \quad (4)$$

After obtaining the starting position Ln and the ending position Rn, the black stripe information corrector 50 obtains the black stripe ending position LBn of the corrected black stripe region SbL1, and the black stripe starting position RBn of the corrected black stripe region SbR1 based on Equations (1) and (2). A similar calculation can be performed also in such a case where the keystone correction in a vertical direction is performed.

As described above, even when inclination angles (correction angles $\alpha$ and $\beta$) of the effective region in the keystone-corrected video signal-with respect to the horizontal direction or the vertical direction-are defined as the keystone correction parameters, the corrected black stripe information can be generated.

Third Example

Figure 7:
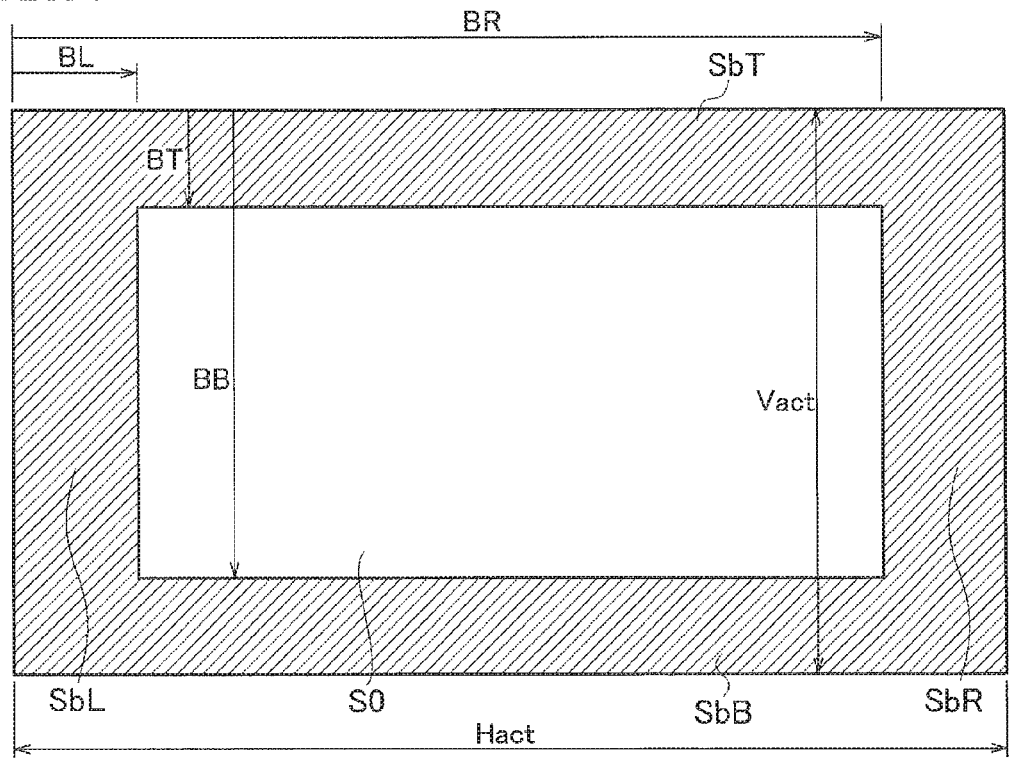
FIG. 7 is a view showing a video signal in which black stripe regions are added to the upper and lower and right and left sides of a video region.

In the third example, as shown in FIG. 7, it is defined that the input video signal is a video signal, in which the right and left black stripe regions SbR and SbL, and the upper and lower black stripe regions SbT and SbB are added to a periphery of the video region S0.

The black stripe detector 20 detects the pixel number BL from the left end portion of the effective region of the video to the ending position of the black stripe region SbL, and the pixel number BR from the left end portion of the effective region of the video to the starting position of the black stripe region SbR. The black stripe detector 20 detects a pixel number BT from an upper end portion of the effective region of the video to an ending position of a black stripe region SbT, and a pixel number BB from the upper end portion of the effective region of the video to a starting position of a black stripe region SbB. An effective pixel number in the horizontal direction of the video is defined as Hact, and a pixel number in the vertical direction thereof is defined as Vact.

Figure 8:
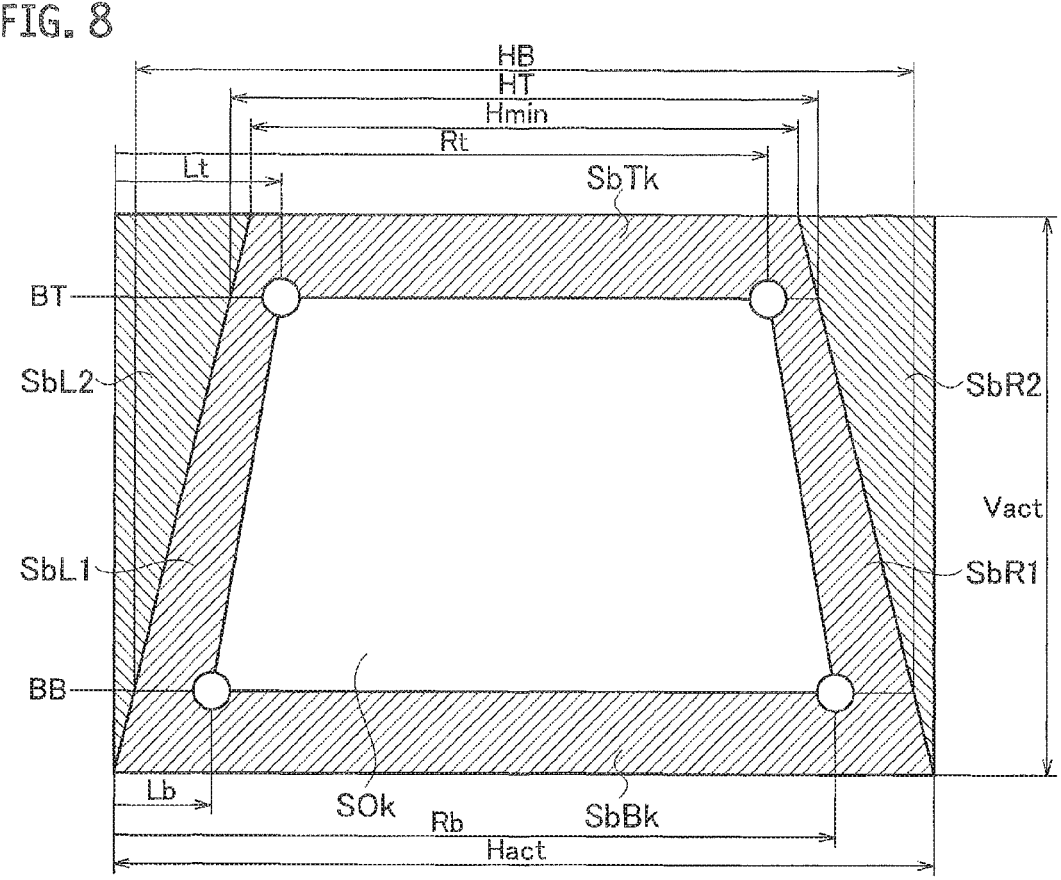
FIG. 8 is a view showing a state where the video signal shown in FIG. 7 is subjected to the keystone correction in the horizontal direction.

It is assumed that the keystone correction processor 30 performs the keystone correction for the video shown in FIG. 7, and generates a video shown in FIG. 8. The video region S0 is converted into the video region S0k.

On the periphery of the video region S0k, the video shown in FIG. 8 includes: the black stripe regions SbTk and SbBk, obtained by performing the keystone correction for the black stripe regions SbT and SbB on the upper and lower sides; the corrected black stripe regions SbR1 and SbL1 obtained by performing the keystone correction for the black stripe regions SbR and SbL on the right and left sides; and the added black stripe regions SbR2 and SbL2 added in order to maintain the aspect ratio of the video on the outside regions of the corrected black stripe regions SbR1 and SbL1.

The keystone correction processor 30 supplies a horizontal reduction ratio Ch of a line, which is reduced the most in the horizontal direction, as such is a keystone correction parameter to the black stripe information corrector 50. In FIG. 8, the line that is reduced the most in the horizontal direction is the uppermost line. If it is assumed that a pixel number of the uppermost line of the corrected black stripe region SbTk is Hmin, then the horizontal reduction ratio Ch is obtained by Hmin/Hact.

If the uppermost line of the video in FIG. 7 is reduced to 80% to become the uppermost line of the corrected black stripe region SbTk, then the horizontal reduction ratio Ch becomes 0.8.

The reduction ratio Ct in the ending line of the corrected black stripe region SbTk is HT/Hact as shown in FIG. 8, and the reduction ratio Cb in the starting line of the corrected black stripe region SbBk is HB/Hact as shown in FIG. 8.

When the pixel numbers Bt and BB, the horizontal reduction ratio Ch as the keystone correction parameter, and the pixel number Vact in the vertical direction are used, the reduction ratios Ct and Cb are obtained by Equations (5) and (6).

$$Ct=Ch+(1-Ch)\times BT/\text{Vact} \tag{5}$$

$$Cb=Ch+(1-Ch)\times BB/\text{Vact} \tag{6}$$

Horizontal positions Lt and Rt of the ending line of the corrected black stripe region SbTk, and horizontal positions Lb and Rb of the starting line of the corrected black stripe region SbBk, the horizontal positions Lt and Rt and Lb and Rb being four corners of the video region S0k, are obtained by Equations (7) and (10).

$$Lt=Ct\times BL+(1-Ct)\times(\text{Hact}/2) \tag{7}$$

$$Rt=Ct\times BR+(1-Ct)\times(\text{Hact}/2) \tag{8}$$

$$Lb=Cb\times BL+(1-Cb)\times(\text{Hact}/2) \tag{9}$$

$$Rb=Cb\times BR+(1-Cb)\times(\text{Hact}/2) \tag{10}$$

Figure 9:
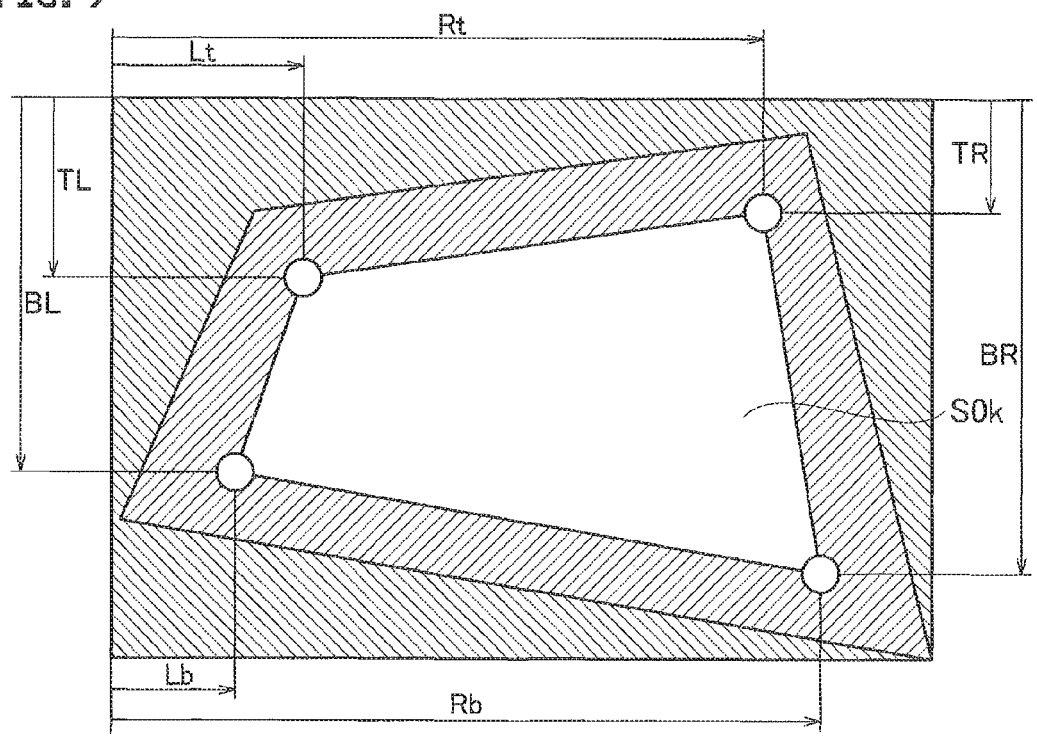
FIG. 9 is a view showing a state where a video signal shown in FIG. 7 is subjected to the keystone correction in the horizontal direction and the vertical direction.

It is assumed that, as shown in FIG. 9, the video S1 is subjected to the keystone correction also in the vertical direction, and that the keystone correction processor 30 further gives a vertical reduction ratio Cv of a horizontal position which is reduced the most in the vertical direction as a keystone correction parameter to the black stripe information corrector 50.

Reduction ratios CLt and CRt in the vertical direction and Lt and Rt in the horizontal positions, and reduction ratios CLb and CRb in the vertical direction and Lb and Rb in the horizontal positions are obtained by Expressions (11) to (14).

$$CLt=Cv+(1-Cv)\times Lt/\text{Hact} \tag{11}$$

$$CRt=Cv+(1-Cv)\times Rt/\text{Hact} \tag{12}$$

$$CLb=Cv+(1-Cv)\times Lb/\text{Hact} \tag{13}$$

$$CRt=Cv+(1-Cv)\times Rb/\text{Hact} \tag{14}$$

The vertical positions TL, BL, Tr, and BR, which are the four corners of the video region S0k of FIG. 9, are obtained by Equations (15) to (18).

$$TL=CLt\times Lt+(1-CLt)\times(\text{Vact}/2) \tag{15}$$

$$BL=CLb\times Lb+(1-CLb)\times(\text{Vact}/2) \tag{16}$$

$$TR=CRt\times Rt+(1-CRt)\times(\text{Vact}/2) \tag{17}$$

$$BR=CRb\times Rb+(1-CRb)\times(\text{Vact}/2) \tag{18}$$

By Equations (7) to (10) and Equations (15) to (18), the video region S0k is determined, which is surrounded by segments connecting the four corners of the video region S0k to one Hence, the black stripe information corrector 50 can supply the video signal processor 60 with, as the corrected black stripe information, information indicating a black stripe ending position and a black stripe starting position at the individual vertical positions of the keystone-corrected video signal, and information indicating a black stripe ending position and a black stripe starting position at the individual horizontal positions of the keystone-corrected video signal.

The present invention is not limited to the embodiment described above, and is changeable in various ways within the scope without departing from the scope of the present invention. The respective constituents of FIG. 1 may be composed of hardware or software. The choice of hardware or software is optional.

What is claimed is:

1. A video signal processing device comprising:
a black stripe detector configured to detect, a black stripe region of an input video signal in which a part of an effective region is a black stripe region, and to generate black stripe information indicating the black stripe region;
a keystone correction processor configured to implement keystone correction processing for the input video signal so as to correct a trapezoidal distortion when the input video signal is projected onto a screen, and to generate a keystone-corrected video signal;
a black stripe information corrector configured to correct the black stripe information to corrected black stripe information based on keystone correction parameters when the keystone correction processor performs keystone correction processing for the input video signal, the corrected black stripe information indicating a corrected black stripe region owned by the keystone correction video signal; and a video signal processor configured to implement predetermined video signal processing for the keystone-corrected video signal by using the keystone-corrected video signal and the corrected black stripe information.

2. The video signal processing device according to claim 1, wherein the keystone correction processor is configured to supply the black stripe information corrector with, as the keystone correction parameters, at least one of information indicating a horizontal effective region starting position and a horizontal effecting region ending position at individual vertical positions of the keystone-corrected video signal, or information indicating a vertical effective region starting position and a vertical effecting region ending position at individual horizontal positions of the keystone-corrected video signal.

3. The video signal processing device according to claim 1, wherein the keystone correction processor is configured to supply the black stripe information corrector with, as the keystone correction parameters, inclination angles of the effective region in the keystone-corrected video signal, with respect to a horizontal direction or a vertical direction.

4. The video signal processing device according to claim 1, wherein the keystone correction processor is configured to supply the black stripe information corrector with, as the keystone correction parameters, at least one of information indicating a horizontal reduction ratio of a line that is reduced the most in a horizontal direction, or information indicating a vertical reduction ratio of a horizontal position that is reduced the most in a vertical direction.

5. The video signal processing device according to claim 1, wherein the video signal processor is a frame rate conversion circuit configured to convert a frame rate of the keystone-corrected video signal or an up-conversion circuit configured to increase a resolution of the keystone-corrected video signal.

6. A projection-type display device comprising:
the video signal processing device according to claim 1; and
a projector configured to project a video signal which is outputted from the video signal processor onto the screen.

* * * * *